United States Patent [19]

Szabo

[11] 3,927,070

[45] Dec. 16, 1975

[54] M-(3,3-DISUBSTITUTED UREIDO) PHENYL [(SUBSTITUTED)METHYL] CARBAMATES

[76] Inventor: Karoly Szabô, Stiegengasse 4/16,, A-1060 Vienna, Austria

[22] Filed: May 8, 1972

[21] Appl. No.: 251,481

[52] U.S. Cl. ........ 260/479 C; 71/106; 260/453 AL; 260/614 R
[51] Int. Cl.² ...................................... C07C 127/19
[58] Field of Search ................................. 260/479 C

[56] References Cited
UNITED STATES PATENTS 3,434,822   3/1969   Wilson et al. ....................... 260/479
3,547,979   12/1970  Brantley et al. .................... 260/479

*Primary Examiner*—James A. Patten
*Attorney, Agent, or Firm*—Harry H. Kline

[57] ABSTRACT

The present invention relates to novel m-(3,3-disubstituted ureido)phenyl [(substituted)methyl]carbamates. It also relates to a method for controlling undesirable plant species with said compounds and to a process for the preparation thereof.

5 Claims, No Drawings

M-(3,3-DISUBSTITUTED UREIDO) PHENYL [(SUBSTITUTED)METHYL] CARBAMATES

This invention relates to novel compounds having the structure:

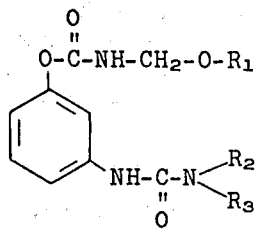

where $R_1$ represents a member selected from the group consisting of alkyl $C_1$-$C_5$, monohaloalkyl $C_1$-$C_5$, and dihaloalkyl $C_1$-$C_5$; $R_2$ represents a member selected from the group consisting of alkyl $C_1$-$C_5$ and alkoxy $C_1$-$C_5$; and $R_3$ is alkyl $C_1$-$C_5$.

The invention also relates to a method for controlling undesirable plant species with the above-identified compounds by (1) applying a herbicidally effective amount of a compound of the above formula to the foliage and plane parts of undesirable plant species or (2) applying a herbicidally effective amount of such compound to soil containing seeds and/or seedling plants of undesirable plant species.

In accordance with the present invention, the m-(3,3-disubstituted ureido)phenyl [(substituted)methyl]carbamates having the formula:

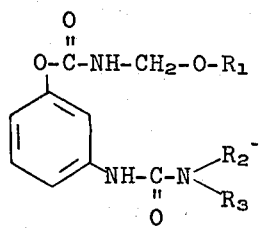

where
$R_1$, $R_2$, and $R_3$ have the following meanings:
$R_1$ = alkyl $C_1$-$C_5$, monohaloalkyl $C_1$-$C_5$, dihaloalkyl $C_1$-$C_5$; where halo is Cl, Br, I, or F, but preferably Cl,
$R_2$ = alkyl $C_1$-$C_5$ and alkoxy $C_1$-$C_5$,
$R_3$ = alkyl $C_1$-$C_5$,
can be prepared by reacting a ureido phenol with an alkoxy or halosubstituted alkoxymethyl isocyanate in an anhydrous aprotic solvent, such as acetone, methylisobutylketone, benzene, toluene, diethyl ether, methylethylketone in the presence of a weak base, such as sodium carbonate, potassium carbonate or triethylamine. The reaction is slightly exothermic and may not require heating; however, it is generally good practice to heat the reaction mixture to reflux temperature when the exotherm has subsided. Equimolar amounts of reactants, i.e., isocyanate and ureido phenol, are generally used in the reaction although an excess of either reactant may be present without seriously affecting the reaction. After refluxing, the solvent is removed from the reaction mixture by evaporation under reduced pressure. Where desired, the crude product may be triturated with hexane, petroleum ether, or the like, and recrystallized from a solvent, such as toluene, ethanol, benzene, or the like. The reaction may be illustrated as follows:

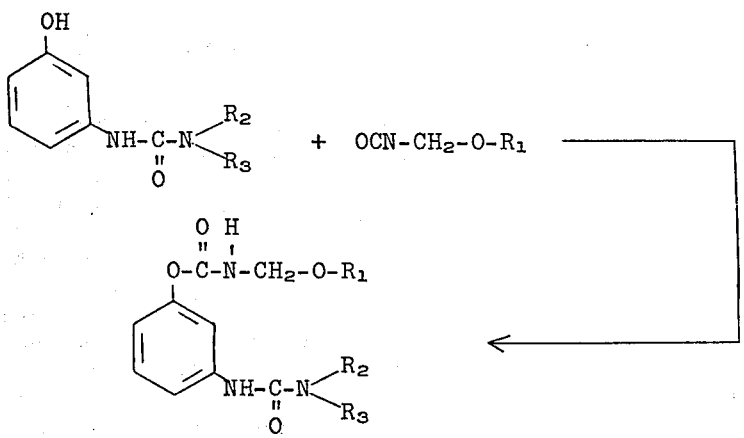

where $R_1$, $R_2$, and $R_3$ are as previously described.

The ureido phenols utilized in the above reaction are known in the art. Similarly, some of the alkoxymethyl isocyanates used in the preparation of the compounds of the present invention are also known. They can be prepared by reacting the appropriate halomethylalkyl ether or halomethyl halosubstituted alkyl ether with silver cyanate. The reaction is preferably run in anhydrous ether using approximately equimolar amounts of the ether and the silver cyanate. As the reaction is usually exothermic, it is generally desirable to use external cooling to maintain the temperature of the reaction mixture below about 20°C. and usually between about 0° and 20°C. The reaction may be illustrated as follows:

$R_1$—O—CH$_2$ halo + AgOCN ⟶ $R_1$—O—CH$_2$—NCO + Ag halo where $R_1$ is alkyl $C_1$-$C_5$, monohaloalkyl $C_1$-$C_5$, or dihaloalkyl $C_1$-$C_5$.

The halomethylalkyl ethers employed in the above reactions can be obtained by conversion of the appropriate alcohol into its halomethyl derivative, preferably its chloromethyl derivative. This can be accomplished by reacting the alcohol with formaldehyde and anhydrous hydrogen halide, preferably HCl gas, at low temperature, i.e., between about 0° and −10°C. Water is split out of the reaction and can be separated from the organic layer by decantation.

The compounds of the present invention can be prepared for application to vegetation or soil containing seeds of undesirable plant species. They can be made up as dusts or dust concentrates by grinding together the active compound and a diluent, such as attapulgite, kaolin, bentonite, talc, diatomaceous earth, or the like. Dusts usually contain about 1% or 15% by weight of the active material while the concentrates may contain from about 25% to 95% by weight of said material. These formulations are particularly useful for control of undesirable plant species when applied to soil, containing seeds or seedlings of undesirable plants, in an amount sufficient to provide from about 0.5 to 20 pounds per acre of the active material.

Wettable powders are made up in the same manner as dust concentrates, but in addition, they generally also contain about 1% to 5% by weight of a wetting agent, such as the alkylnaphthalene sulfonates, sulfated fatty alcohols, sulfonated fatty acid esters, and esters of sodium sulfosuccinate. They also generally contain from about 1% to 5% by weight of a dispersant, such as the lignin sulfonates, polyvinyl alcohols, sodium naphthalene sulfonate, or the like. In use these wettable powder formulations are generally dispersed in water and applied to vegetation or soil as a liquid spray. For both postemergence and preemergence applications, it is usually desirable to apply sufficient spray to provide about 0.5 to 20 pounds per acre, and preferably 0.5 to 8 pounds per acre of the active compound.

The compounds of this invention may also be made up in the form of granules or pellets. The active compounds can be dissolved in a volatile solvent, such as acetone, and sprayed on sorptive granules, such as attaclay, ground corn cobs, or heat expanded vermiculite to provide herbicidal granules which can be applied with conventional applicators.

Herbicidal granules can also be prepared by treating non-sorptive granules, such as sand or diatomaceous earth, with a binder solution, such as a sugar solution, zinc chloride solution, or the like, and treating the wetted granules with a dust or dust concentrate containing the active material. These formulations are, likewise, generally applied in sufficient amount to provide about 0.5 to 20 pounds per acre of active compound.

The following examples are given primarily by way of illustration. No specific details or enumerations contained therein should be construed as limitations on the present invention except insofar as they appear in the appended claims. All parts and percentages are by weight unless otherwise specifically designated.

EXAMPLE 1

Conversion of Isobutyl Alcohol into its Chloromethyl Derivative

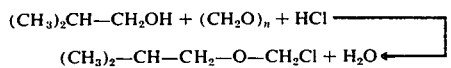

A mixture of isobutyl alcohol and formaldehyde was cooled to $-10°C.$, under nitrogen. Hydrogen chloride was then passed with stirring into the reaction mixture for ¾ hour and the temperature of the mixture was maintained at $-5°$ to $-10°C$. The mixture separated into two layers. The lower aqueous layer was separated, and the organic component dried over anhydrous calcium chloride. Fraction distillation using a 12-inch Vigreux column afforded a liquid b.p. 44° – 48°C./53 – 63 mm., yield 413 grams.

EXAMPLE 2

Conversion of 3-Pentanol into the Corresponding Chloromethyl Derivative

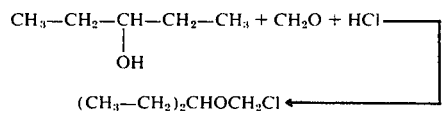

A mixture of 50 grams of 3-pentanol and 17 grams of para-formaldehyde were placed in a 3-necked round-bottomed flask and cooled by water. Dry hydrogen chloride was passed slowly into the mixture while the p-formaldehyde disappeared. The aqueous layer was separated and the organic layer dried over anhydrous magnesium sulfate to give 75 grams of crude product. Distillation afforded 67 grams, b.p. 51°/15 - 20 mm., $n_D^{26}$ 1.4225.

EXAMPLE 3

Preparation of (Isobutoxy)methyl Isocyanate

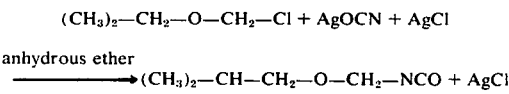

Silver cyanate (170 grams) was suspended in 500 ml. of anhydrous ether and cooled to 10°C. The reaction vessel was equipped for stirring and provided with a condenser and dropping funnel. To the cold ether and cyanate mixture was slowly added the chloromethyl isobutyl ether while maintaining the temperature of the mixture at 10°C. The reaction was exothermic and the addition time was 1 hour. Stirring was continued at room temperature for 2 hours and then followed by gentle reflux for another 2 hours. The mixture was cooled and the inorganic salts filtered off and the solvent removed by evaporation.

The residue was distilled and gave product with boiling point 39° – 42°C./25 to 30 mm., yield 95 grams.

EXAMPLE 4

Preparation of (1-Ethylpropoxy)methyl Isocyanate

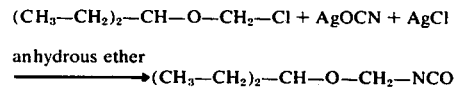

Silver cyanate (49 grams) was suspended in 200 ml. of anhydrous ether, and gently stirred using a magnetic stirrer at 10° to 15°C. The chloromethyl derivative was added dropwise during ½ hour. After the addition was complete, the reaction mixture was refluxed for 2 hours. The silver salt was filtered off and washed with fresh anhydrous ether. The ether was removed by evaporation in vacuo on a rotary evaporator.

The residue was distilled, to give a product, b.p. 65° – 70°C. at 25 – 30 mm.

EXAMPLE 5

Preparation of Methoxymethyl Isocyanate

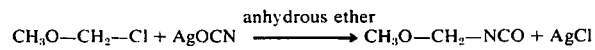

To a suspension of silver cyanate (225 grams) in 750 ml. of anhydrous ether. cooled to 10° – 20° and gently stirred using a magnetic stirrer was added dropwise chloromethyl methyl ether (110 grams). The reaction was exothermic and addition time was 1 to 1½ hours. After the addition was complete, the mixture was stirred for 1 hour at room temperature and refluxed for 2 hours.

The inorganic salts were filtered off and the ether carefully distilled off to give product boiling point 88° – 91°C., yield, 40 grams.

EXAMPLE 6

Preparation of (Isopropoxy)methyl Isocyanate

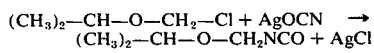

(CH$_3$)$_2$—CH—O—CH$_2$—Cl + AgOCN → (CH$_3$)$_2$—CH—O—CH$_2$NCO + AgCl

The chloromethyl isopropyl ether was added to a stirred suspension of silver cyanate (80 grams, excess 151 grams) in anhydrous ether (250 ml.) cooled to 15°C. during ½ hour. After the addition was complete, the reaction mixture was refluxed for 4 hours. The inorganic salts were filtered off and solvent ether removed by evaporation at low temperatures around 30°C.

The residue was distilled in vacuo to give a product b.p. 89° – 91°C. Yield, 35 grams, n$_D^{21.8}$ 1.4010.

EXAMPLE 7

Preparation of m-(3-methoxy-3-methylureido)phenyl (isobutoxymethyl)carbamate

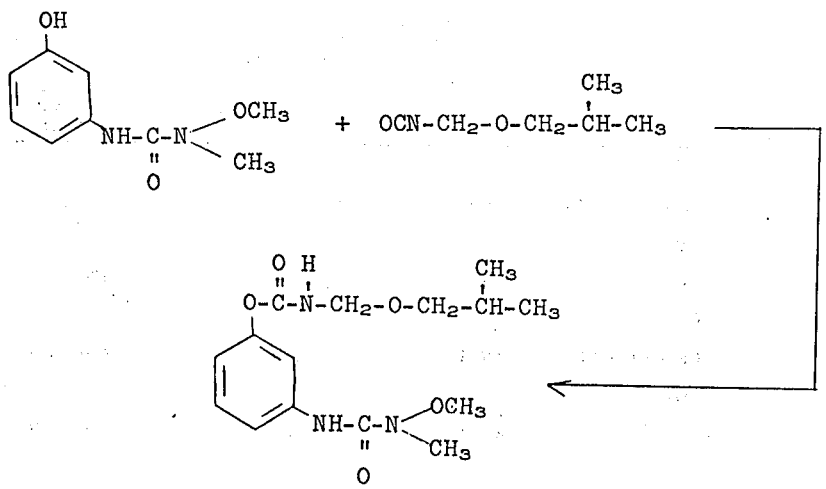

In a 50 ml. flask were placed 1.96 grams (0.10 mole) of 3-(m-hydroxyphenyl)-1-methoxy-1-methylurea. To this was added 15 ml. of acetone (anhydrous), followed by two to three drops of anhydrous triethylamine, and finally the above isocyanate (0.10 mole) 1.3 grams. The mixture warmed slightly and was then refluxed for 1 hour, and then stirred for another 3 hours. The solvent was removed by evaporation in vacuo leaving an oily residue which was then triturated with petroleum ether (60° to 70°C. boiling point). The residue hardened to a crystalline mass, and was recrystallized from ethanol to yield 2.4 grams of product, melting point 151° to 153°C.

EXAMPLE 8

Preparation of m-(3-methoxy-3-methylureido)phenyl [(1-ethylpropoxy)methyl]carbamate

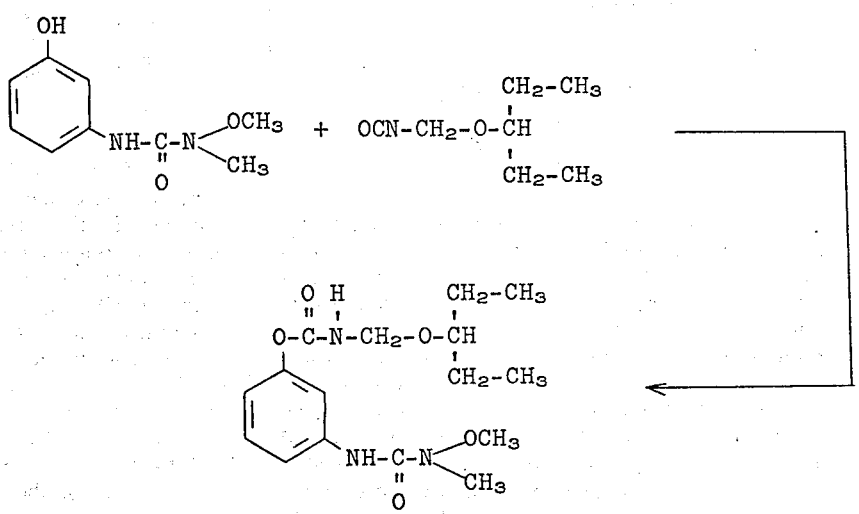

In a 100 ml. round-bottomed flask were placed 1.96 grams (0.01 mole) of the ureido compound. To this was added 25 ml. of acetone followed by a few drops of triethylamine and 1.44 grams of (1-ethylpropoxy)-methyl isocyanate (0.10 mole). The reaction mixture warmed slightly and was then heated under reflux for 1 hour. The solvent was removed by evaporation in vacuo and the residue therefrom triturated with hexane. When a white solid product was obtained, it was filtered off and recrystallized from toluene to yield 3.3 grams (68%) of product melting at 111° to 114°C.

EXAMPLE 9

Preparation of m-(3-methoxy-3-methylureido)phenyl (methoxymethyl)carbamate

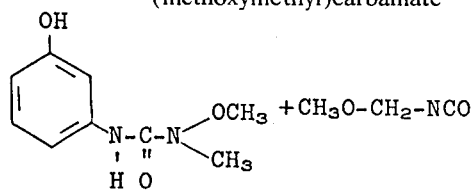

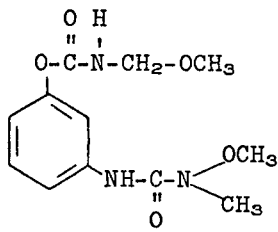

In a 100 ml. round-bottomed flask were placed 1.96 grams of the above ureido compound (0.01 mole) dissolved in 10–15 ml. of acetone. The methoxymethyl isocyanate (0.88 grams, 0.01 mole) was then added to the mixture, followed by the addition of three drops of triethylamine. The reaction is slightly exothermic. After the reaction had subsided the mixture was refluxed for an hour with stirring. Stirring was continued for another 3 hours after reflux and then the solvent was removed by evaporation under vacuo. The residue was triturated with hexane. When a white crystalline product resulted, it was recrystallized from toluene to yield a product melting at 109° to 112°C., yield 2.4 grams (85%).

EXAMPLE 10

Preparation of m-(3-methoxy-3-methylureido)phenyl (isopropoxymethyl)carbamate

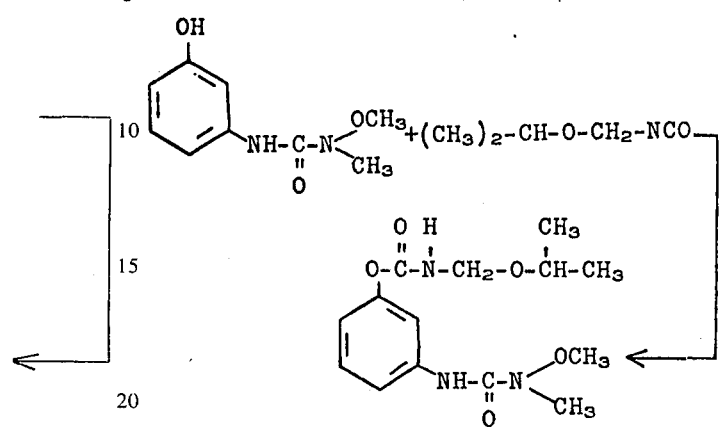

In a 100 ml. round-bottomed flask were placed 1.96 grams of the ureidophenol (0.01 mole) and 25 ml. of acetone. To the acetone solution were added a few drops of triethylamine, followed by addition of the above isocyanate (isopropoxymethyl isocyanate), 1.16 grams (0.10 mole). The mixture warmed slightly and was refluxed for 1 hour. The solvent was removed by evaporation in vacuo on a rotary evaporator and the residue was triturated with hexane to yield a crystalline material. The product was filtered off and recrystallized from benzene to yield 2 grams (64%) of product melting at 129° to 131°C.

Following the above procedure and substituting the appropriate ureido phenols and alkoxymethyl isocyanates in the reaction yields the products set forth in Table I below.

TABLE I

| $R_1$ | $R_2$ | $R_3$ | Product Melting Point |
|---|---|---|---|
| —CH(CH₃)—CH₂—CH₂CH₃ | —OCH₃ | —CH₃ | 109–111°C. |
| —CH(CH₃)—CH₂Cl | —CH₃ | —CH₃ | 126–129°C. |
| —CH₂—CH₂—Cl | —OCH₃ | —CH₃ | 110–112°C. |
| —CH(CH₃)—CHCl—CH₂Cl | —OCH₃ | —CH₃ | 139–140°C. |
| —CH(CH₃)—CH₂—Cl | —OCH₃ | —CH₃ | 144–145°C. |

TABLE I -continued

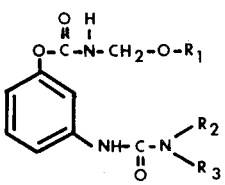

| $R_1$ | $R_2$ | $R_3$ | Product Melting Point |
|---|---|---|---|
| —CH₂—CH₂—Cl | —CH₃ | —CH₃ | 125–128°C. |
| —CH₂—CH(CH₃)CH₃ | —OCH₃ | —CH₃ | 146–148°C. |
| —C(CH₃)(Cl)—CH—CH₂—Cl | —CH₃ | —CH₃ | 147–149°C. |
| —CH₂—CH(CH₃)CH₃ | —CH₃ | —CH₃ | 150–151°C. |
| —CH₂—CH₂—CH₃ | —OC₂H₅ | —C₂H₅ | — |
| —C₃H₇—n | —OC₃H₇—n | —CH₂—CH(CH₃)₂ | — |
| —CH(CH₃)CH₃ | —CH(CH₃)CH₃ | —CH(CH₃)CH₃ | — |
| —C₂H₅ | —OC₃H₇—n | —CH₃ | — |
| —CH(CH₃)(CH₂)₂CH₃ | —OCH₂(CH₂)₂CH₃ | —CH₂(CH₂)CH₃ | — |
| —CH₂—CH₂Cl | —C₂H₅ | —C₂H₅ | — |
| —CHCl₂ | —OC₂H₅ | —C₃H₇—n | — |

EXAMPLE 11

The postemergence herbicidal activity of the compounds of the present invention is demonstrated by the following tests. In said tests, ten-day old crabgrass, yellow foxtail, wild oats, mustard, bindweed and bush bean plants are sprayed with 35%/65% water/acetone solutions of test compound. Each flat was sprayed with 15 ml. of solution containing 1% of the surfactant Tween 20 and 50 mg. of compound. The sprayed plants were then placed on greenhouse benches and cared for in accordance with normal greenhouse procedures. Three weeks after treatment, all plants were examined and rated. The results obtained appear in Table II below.

TABLE II

Postemergence Activity

| Compound | Crabgrass | Watergrass | Indian Mustard | Corn | Wild Oats | Curled Dock | Bush Bean |
|---|---|---|---|---|---|---|---|
| 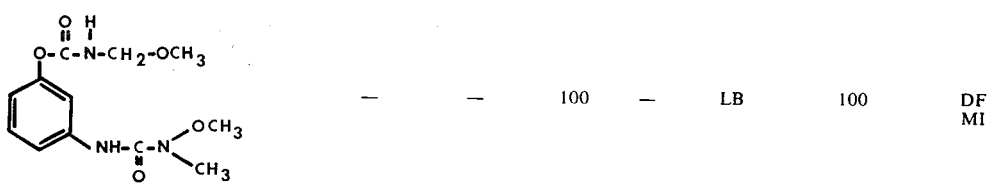 | — | — | 100 | — | LB | 100 | DF MI |

TABLE II -continued

| | Postemergence Activity % Kill | | | | | | |
|---|---|---|---|---|---|---|---|
| Compound | Crabgrass | Watergrass | Indian Mustard | Corn | Wild Oats | Curled Dock | Bush Bean |
| 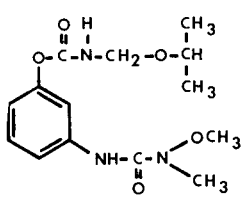 | LB MI | — | 100 | — | LB | 100 | — |

DF - Dead Foliage
LB - Leaf Burn
MI - Moderate Injury

EXAMPLE 12

The postemergence herbicidal activity of the compounds of the present invention is demonstrated by the following tests. A variety of monocotyledonous and dicotyledonous plants, approximately 2 weeks old and growing in flats, are sprayed with 35%/65% aqueous acetone mixtures containing the surfactant Tween 20 added to 0.5% v/v, and test compound in sufficient concentration to provide the equivalent of 0.5, 1.0 or 4.0 pounds of active compound per acre, when sprayed on the flats for a given period under 86 psi pressure.

After spraying, the flats are placed on greenhouse benches and cared for in accordance with normal greenhouse practices. Three weeks after treatment, the plants are examined and rated according to the index given below. The data are reported in Table III.

Plant Species:

| | |
|---|---|
| MG | annual morning-glory |
| COT | cotton |
| SB | sugar beet |
| SOY | soybean |
| COR | corn |
| WO | wild oats |
| BA | barnyardgrass |
| FOX | green foxtail |
| MI | foxtail millet |
| RAG | ragweed |
| MU | mustard |
| LA | lambsquarters |

| Rating System: | | % Difference in Growth from the Check[1] |
|---|---|---|
| 0 | no effect | 0 |
| 1 | possible effect | 1–10 |
| 2 | slight effect | 11–25 |
| 3 | moderate effect | 26–40 |
| 5 | definite injury | 41–60 |
| 6 | herbicidal effect | 61–75 |
| 7 | good herbicidal effect | 76–90 |
| 8 | approaching complete kill | 91–99 |
| 9 | complete kill | 100 |
| 4 | abnormal growth, i.e., a definite physiological malformation but with an over-all effect less than a 5 on the rating scale. | |

[1]Based on visual determination of stand, size, vigor, chlorosis, growth malformation, and over-all plant appearance.

TABLE III

Postemergence Herbicidal Activity

| Compound | lbs./acre Rate | MG | COT | SB | SOY | COR | WO | BA | FOX | MI | RAG | MU | LA |
|---|---|---|---|---|---|---|---|---|---|---|---|---|---|
| 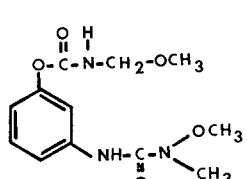 | 0.5 | 9 | 9 | 9 | 7 | 9 | 7 | 3 | 1 | 8 | 9 | 9 | 8 |
| | 1.0 | 9 | 9 | 9 | 9 | 5 | 8 | 8 | 8 | 8 | 9 | 9 | 9 |
| | 4.0 | 9 | 9 | 9 | 9 | 9 | 9 | 9 | 8 | 9 | 9 | 9 | 9 |
| 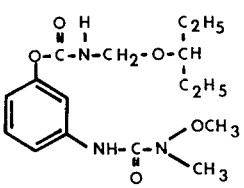 | 0.5 | 9 | 9 | 9 | 9 | 9 | 9 | 9 | 9 | 9 | 9 | 9 | 9 |
| | 1.0 | 9 | 9 | 9 | 9 | 7 | 9 | 9 | 9 | 9 | 9 | 9 | 9 |
| | 4.0 | 9 | 9 | 9 | 9 | 7 | 9 | 9 | 9 | 9 | 9 | 9 | 9 |

TABLE III-continued

Postemergence Herbicidal Activity

| Compound | lbs./acre Rate | MG | COT | SB | SOY | COR | WO | BA | FOX | MI | RAG | MU | LA |
|---|---|---|---|---|---|---|---|---|---|---|---|---|---|
| [structure: O-C(=O)-NH-CH₂-O-CH₂-CH(CH₃)₂ phenyl with NH-C(=O)-N(OCH₃)(CH₃)] | 0.5 | 9 | 9 | 7 | 8 | 1 | 6 | 7 | 1 | 8 | 9 | 9 | 9 |
|  | 1.0 | 9 | 9 | 8 | 9 | 9 | 9 | 9 | 8 | 8 | 9 | 9 | 9 |
|  | 4.0 | 9 | 9 | 9 | 9 | 9 | 9 | 9 | 9 | 9 | 9 | 9 | 9 |
| [structure: O-C(=O)-NH-CH₂-O-CH(CH₃)₂ phenyl with NH-C(=O)-N(OCH₃)(CH₃)] | 0.5 | 9 | 9 | 9 | 9 | 8 | 9 | 7 | 6 | 8 | 9 | 9 | 9 |
|  | 1.0 | 9 | 9 | 9 | 9 | 8 | 9 | 9 | 6 | 9 | 9 | 9 | 9 |
|  | 4.0 | 9 | 9 | 9 | 9 | 9 | 9 | 9 | 9 | 9 | 9 | 9 | 9 |
| [structure: O-C(=O)-NH-CH₂-O-CH(CH₃)-CH₂-CH₂-CH₃ phenyl with NH-C(=O)-N(OCH₃)(CH₃)] | 0.5 | 9 | 9 | 9 | 9 | 9 | 8 | 5 | 9 | 9 | 9 | 9 | 9 |
|  | 1.0 | 9 | 9 | 9 | 9 | 9 | 8 | 9 | 9 | 9 | 9 | 9 | 9 |
|  | 4.0 | 9 | 9 | 9 | 9 | 9 | 9 | 9 | 9 | 9 | 9 | 9 | 9 |
| [structure: O-C(=O)-NH-CH₂-C(CH₂Cl)(CH₃)- phenyl with NH-C(=O)-N(CH₃)₂] | 0.5 | 9 | 9 | 9 | 9 | 3 | 8 | 1 | 7 | 3 | 9 | 9 | 6 |
|  | 1.0 | 9 | 9 | 9 | 9 | 8 | 8 | 5 | 9 | 7 | 9 | 9 | 8 |
|  | 4.0 | 9 | 9 | 9 | 9 | 9 | 9 | 9 | 9 | 9 | 9 | 9 | 9 |
| [structure: O-C(=O)-NH-CH₂-O-CH₂-CH₂-Cl phenyl with NH-C(=O)-N(CH₃)₂] | 0.5 | 9 | 9 | 9 | 9 | 9 | 9 | 1 | 8 | 5 | 9 | 9 | 7 |
|  | 1.0 | 9 | 9 | 9 | 9 | 6 | 9 | 3 | 9 | 5 | 9 | 9 | 7 |
|  | 4.0 | 9 | 9 | 9 | 9 | 9 | 9 | 9 | 9 | 9 | 9 | 9 | 9 |
| [structure: O-C(=O)-NH-CH₂-O-CH(CH₃)-CH(Cl)-CH₂-Cl phenyl with NH-C(=O)-N(CH₃)(OCH₃)] | 0.5 | 0 | 7 | 0 | 0 | 0 | 3 | 0 | 8 | 0 | 5 | 9 | 0 |
|  | 1.0 | 9 | 9 | 6 | 7 | 3 | 1 | 1 | 7 | 5 | 9 | 9 | 9 |
|  | 4.0 | 9 | 8 | 9 | 9 | 9 | 8 | 2 | 9 | 7 | 9 | 9 | 3 |
| [structure: O-C(=O)-NH-CH₂-O-CH(CH₃)-CH₂Cl phenyl with NH-C(=O)-N(OCH₃)(CH₃)] | 0.5 | 9 | 9 | 9 | 9 | 8 | 9 | 1 | 9 | 6 | 9 | 9 | 8 |
|  | 1.0 | 9 | 9 | 9 | 8 | 9 | 9 | 7 | 9 | 7 | 9 | 9 | 9 |
|  | 4.0 | 6 | 9 | 9 | 9 | 9 | 9 | 9 | 9 | 9 | 9 | 9 | 7 |
| [structure: O-C(=O)-NH-CH₂-O-CH₂-CH₂-Cl phenyl with NH-C(=O)-N(CH₃)(OCH₃)] | 0.5 | 9 | 9 | 9 | 9 | 8 | 8 | 1 | 7 | 5 | 9 | 9 | 6 |
|  | 1.0 | 9 | 9 | 9 | 9 | 9 | 8 | 5 | 9 | 8 | 9 | 9 | 9 |
|  | 4.0 | 9 | 9 | 9 | 9 | 8 | 9 | 8 | 9 | 7 | 9 | 9 | 9 |

TABLE III-continued

Postemergence Herbicidal Activity

Ratings

| Compound | lbs./acre Rate | MG | COT | SB | SOY | COR | WO | BA | FOX | MI | RAG | MU | LA |
|---|---|---|---|---|---|---|---|---|---|---|---|---|---|
| [structure: O-C(=O)-N(H)-CH$_2$-O-CH$_2$-CH(CH$_3$)$_2$ on phenyl with NH-C(=O)-N(CH$_3$)$_2$] | 0.5 | 9 | 9 | 0 | 3 | 0 | 0 | 6 | 8 | 3 | 9 | 9 | 0 |
|  | 1.0 | 9 | 9 | 1 | 9 | 2 | 9 | 8 | 8 | 7 | 9 | 9 | 2 |
|  | 4.0 | 9 | 9 | 8 | 9 | 9 | 9 | 9 | 9 | 9 | 9 | 9 | 8 |
| [structure: O-C(=O)-N(H)-CH$_2$-O-CH(Cl)-CH-CH$_2$-Cl on phenyl with NH-C(=O)-N(CH$_3$)$_2$] | 0.5 | 9 | 9 | 9 | 9 | 5 | 1 | 1 | 8 | 6 | 9 | 9 | 8 |
|  | 1.0 | 9 | 9 | 9 | 9 | 6 | 8 | 1 | 8 | 6 | 9 | 9 | 8 |
|  | 4.0 | 1 | 3 | 7 | 9 | 9 | 9 | 8 | 9 | 8 | 9 | 9 | 8 |

EXAMPLE 13

The preemergence herbicidal activity of the compounds of the present invention is demonstrated by the following tests. In said tests, seeds of crabgrass, corn, watergrass, wild oats, bush beans, Indian mustard, and curled dock are planted in flats. The seeded flats are then sprayed with an acetone/water mixture and 50 mg. of test compound. This treatment provides the equivalent of 20 pounds per acre of test compound. After spraying, the flats are placed on greenhouse benches nd cared for in accordance with conventional greenhouse procedures. Three weeks after spraying, the flats are examined and rated for herbicidal activity. The data are reported in Table IV below.

TABLE IV

Preemergence Activity

% Kill

| Compound | Crab-grass | Water-grass | Indian Mustard | Wild Oats | Corn | Curled Dock | Bush Bean |
|---|---|---|---|---|---|---|---|
| [structure: O-C(=O)-N(H)-CH$_2$-O-CH$_3$ on phenyl with NH-C(=O)-N(OCH$_3$)(CH$_3$)] | 100 | 100 | 100 | 100 | 100 | 100 | 100 |
| [structure: O-C(=O)-N(H)-CH$_2$-O-CH(C$_2$H$_5$)$_2$ on phenyl with NH-C(=O)-N(OCH$_3$)(CH$_3$)] | 100 | 100 | 100 | 100 | 100 | 100 | 100 |
| [structure: O-C(=O)-N(H)-CH$_2$-O-CH$_2$-CH(CH$_3$)$_2$ on phenyl with NH-C(=O)-N(OCH$_3$)(CH$_3$)] | 100 | 100 | 100 | 100 | 100 | 100 | ST IG CH MI |

ST - Stunting
IG - Inhibits Germination
CH - Chlorosis
MI - Moderate Injury

EXAMPLE 14

The preemergence herbicidal activity of the compounds of the invention is demonstrated in the following tests. Seeds of a variety of monocotyledonous and dicotyledonous plants are mixed with potting soil and planted in plastic pots in the top one inch of potting soil. The seeded pots are then sprayed with a test solution (35%/65% acetone/water) containing test compound. The concentrations are such as to provide the equivalent of 0.5, 1.0 or 4.0 pounds per acre of acre of active compound when sprayed at 86 psi.

After spraying, the pots are placed on greenhouse benches and cared for in routine fashion. Four weeks after treatment, the pots are examined and rated according to the index given above.

TABLE V

Preemergence Herbicidal Activity

| Compound | lbs./acre Rate | MG | SB | SOY | COR | WO | BA | FOX | MI | RAG | MU | LA |
|---|---|---|---|---|---|---|---|---|---|---|---|---|
| [structure 1: O-C(O)-N-CH$_2$-OCH$_3$ / NH-C(O)-N(OCH$_3$)(CH$_3$)] | 0.5 | 8 | 5 | 5 | 7 | 0 | 7 | 8 | 7 | 5 | 5 | 9 | 7 |
| | 1.0 | 9 | 8 | 8 | 9 | 2 | 8 | 9 | 9 | 6 | 9 | 9 | 8 |
| | 4.0 | 9 | 9 | 9 | 9 | 9 | 9 | 9 | 9 | 9 | 9 | 9 | 9 |
| [structure 2: O-C(O)-N-CH$_2$-O-CH(C$_2$H$_5$)$_2$ / NH-C(O)-N(OCH$_3$)(CH$_3$)] | 0.5 | 3 | 3 | 0 | 0 | 0 | 3 | 8 | 7 | 0 | 8 | 9 | 8 |
| | 1.0 | 5 | 7 | 9 | 5 | 5 | 7 | 8 | 9 | 1 | 9 | 9 | 8 |
| | 4.0 | 9 | 9 | 9 | 9 | 9 | 9 | 9 | 9 | 9 | 9 | 9 | 9 |
| [structure 3: O-C(O)-N-CH$_2$-O-CH$_2$-CH(CH$_3$)$_2$ / NH-C(O)-N(OCH$_3$)(CH$_3$)] | 0.5 | 1 | 0 | 0 | 2 | 0 | 2 | 7 | 9 | 1 | 9 | 9 | 7 |
| | 1.0 | 9 | 0 | 6 | 5 | 1 | 9 | 9 | 9 | 9 | 9 | 9 | 9 |
| | 4.0 | 9 | 9 | 9 | 9 | 9 | 9 | 9 | 9 | 9 | 9 | 9 | 9 |
| [structure 4: O-C(O)-N-CH$_2$-O-CH(CH$_3$)$_2$ / NH-C(O)-N(OCH$_3$)(CH$_3$)] | 0.5 | 3 | 0 | 6 | 6 | 3 | 7 | 8 | 8 | 5 | 9 | 9 | 9 |
| | 1.0 | 9 | 8 | 9 | 7 | 7 | 7 | 8 | 9 | 8 | 9 | 9 | 8 |
| | 4.0 | 9 | 9 | 9 | 9 | 9 | 9 | 9 | 9 | 9 | 9 | 9 | 9 |
| [structure 5: O-C(O)-N-CH$_2$-O-CH(CH$_3$)-CH$_2$-CH$_2$-CH$_3$ / NH-C(O)-N(OCH$_3$)(CH$_3$)] | 0.5 | 1 | 2 | 0 | 1 | 2 | 0 | 1 | 1 | 0 | 9 | 9 | 8 |
| | 1.0 | 3 | 1 | 9 | 8 | 0 | 6 | 7 | 9 | 6 | 9 | 9 | 9 |
| | 4.0 | 9 | 9 | 9 | 8 | 3 | 8 | 9 | 9 | 7 | 9 | 9 | 9 |
| [structure 6: O-C(O)-N-CH$_2$-C(CH$_2$Cl)(CH$_3$) / NH-C(O)-N(CH$_3$)$_2$] | 0.5 | 0 | 0 | 0 | 0 | 0 | 2 | 3 | 2 | 1 | 3 | 9 | 5 |
| | 1.0 | 6 | 9 | 8 | 7 | 8 | 5 | 6 | 9 | 3 | 9 | 9 | 8 |
| | 4.0 | 9 | 9 | 9 | 9 | 9 | 9 | 9 | 9 | 8 | 9 | 9 | 9 |
| [structure 7: O-C(O)-N-CH$_2$-O-CH$_2$-CH$_2$-Cl / NH-C(O)-N(CH$_3$)(OCH$_3$)] | 0.5 | 0 | 0 | 1 | 2 | 0 | 5 | 1 | 6 | 3 | 1 | 3 | 1 |
| | 1.0 | 9 | 3 | 8 | 9 | 0 | 7 | 6 | 9 | 5 | 8 | 9 | 6 |
| | 4.0 | 9 | 9 | 9 | 9 | 9 | 9 | 9 | 9 | 9 | 9 | 9 | 9 |

TABLE V-continued

Preemergence Herbicidal Activity

| Compound | lbs./acre Rate | MG | SB | SOY | COR | WO | BA | FOX | MI | RAG | MU | LA |
|---|---|---|---|---|---|---|---|---|---|---|---|---|
| (structure 1) | 0.5 | 0 | 0 | 0 | 0 | 0 | 0 | 0 | 0 | 0 | 0 | 0 |
|  | 1.0 | 0 | 0 | 0 | 0 | 0 | 3 | 0 | 2 | 0 | 1 | 9 | 6 |
|  | 4.0 | 9 | 9 | 9 | 9 | 8 | 9 | 8 | 9 | 8 | 9 | 9 | 8 |
| (structure 2) | 0.5 | 7 | 0 | 0 | 2 | 0 | 5 | 5 | 7 | 1 | 3 | 8 | 7 |
|  | 1.0 | 9 | 9 | 9 | 8 | 6 | 9 | 8 | 9 | 7 | 9 | 9 | 8 |
|  | 4.0 | 9 | 9 | 9 | 9 | 9 | 9 | 8 | 9 | 9 | 9 | 9 | 8 |
| (structure 3) | 0.5 | 1 | 1 | 0 | 0 | 0 | 1 | 2 | 0 | 0 | 1 | 7 | 3 |
|  | 1.0 | 9 | 8 | 7 | 3 | 0 | 5 | 6 | 5 | 5 | 5 | 6 | 9 |
|  | 4.0 | 9 | 9 | 9 | 9 | 9 | 9 | 7 | 9 | 9 | 9 | 9 | 8 |
| (structure 4) | 0.5 | 0 | 0 | 7 | 3 | 3 | 1 | 7 | 7 | 0 | 5 | 7 | 0 |
|  | 1.0 | 0 | 0 | 3 | 3 | 6 | 1 | 9 | 9 | 5 | 9 | 9 | 3 |
|  | 4.0 | 9 | 9 | 9 | 9 | 9 | 9 | 9 | 9 | 9 | 9 | 9 | 9 |
| (structure 5) | 0.5 | 0 | 0 | 0 | 0 | 0 | 0 | 0 | 0 | 0 | 0 | 0 | 3 |
|  | 1.0 | 0 | 1 | 0 | 1 | 0 | 0 | 3 | 3 | 1 | 0 | 5 | 7 |
|  | 4.0 | 9 | 9 | 9 | 7 | 8 | 8 | 8 | 9 | 7 | 9 | 9 | 8 |

I claim:
1. A compound: m-(3-methoxy-3-methyl ureido)-phenyl [(methoxy)methyl]carbamate.
2. A compound: m-(3-methoxy-3-methyl ureido)-phenyl [(1-ethylpropoxy)methyl]carbamate.
3. A compound: m-(3-methoxy-3-methyl ureido)-phenyl (isobutoxymethyl)carbamate.
4. A compound: m-(3-methoxy-3-methyl ureido)-phenyl (isopropoxymethyl)carbamate.
5. A compound: m-(3,3-dimethyl ureido)phenyl [(2-chloro-1-methylethoxy)methyl]carbamate.

* * * * *